(12) United States Patent
Habib et al.

(10) Patent No.: US 9,103,679 B2
(45) Date of Patent: Aug. 11, 2015

(54) NAVIGATION SYSTEM WITH DISPLAY CONTROL MECHANISM AND METHOD OF OPERATION THEREOF

(71) Applicant: TeleNav, Inc., Sunnyvale, CA (US)

(72) Inventors: Md Ahsan Habib, Santa Clara, CA (US); Hengbin Luo, San Jose, CA (US); Shannph Wong, San Francisco, CA (US)

(73) Assignee: TELENAV, INC., Sunnyvale, CA (US)

( * ) Notice: Subject to any disclaimer, the term of this patent is extended or adjusted under 35 U.S.C. 154(b) by 155 days.

(21) Appl. No.: 13/757,629

(22) Filed: Feb. 1, 2013

(65) Prior Publication Data

US 2013/0201077 A1    Aug. 8, 2013

Related U.S. Application Data

(60) Provisional application No. 61/594,335, filed on Feb. 2, 2012.

(51) Int. Cl.
*G09G 5/00* (2006.01)
*G01C 21/00* (2006.01)
*G01C 21/32* (2006.01)
*G01C 21/36* (2006.01)

(52) U.S. Cl.
CPC ............... *G01C 21/00* (2013.01); *G01C 21/32* (2013.01); *G01C 21/367* (2013.01)

(58) Field of Classification Search
CPC ....... G01C 21/00; G01C 21/367; G01C 21/32
USPC .......................................................... 345/1.1
See application file for complete search history.

(56) References Cited

U.S. PATENT DOCUMENTS

2010/0039314 A1* 2/2010 Gupta ..................... 342/357.1
2010/0060572 A1* 3/2010 Tsern ....................... 345/157
2013/0214995 A1* 8/2013 Lewin et al. ............... 345/1.3

* cited by examiner

*Primary Examiner* — Charles V Hicks
(74) *Attorney, Agent, or Firm* — IP Investment Law Group

(57) ABSTRACT

A method of operation of a navigation system includes: determining a frame of a map based on a current travel-direction for tracking a movement of a first device; generating a directional-tile from the frame based on the current travel-direction; and transferring the directional-tile for displaying a navigation map on a second device using the directional-tile from the first device.

20 Claims, 6 Drawing Sheets

NAVIGATION SYSTEM WITH DISPLAY CONTROL MECHANISM AND METHOD OF OPERATION THEREOF

CROSS-REFERENCE TO RELATED APPLICATION(S)

This application claims the benefit of U.S. Provisional Patent Application Ser. No. 61/594,335 filed Feb. 2, 2012, and the subject matter thereof is incorporated herein by reference thereto.

TECHNICAL FIELD

An embodiment of the present invention relates generally to a navigation system, and more particularly to a navigation system with display control mechanism.

BACKGROUND ART

Modern consumer and industrial electronics, especially devices such as graphical navigation systems, televisions, projectors, cellular phones, portable digital assistants, and combination devices, are providing increasing levels of functionality to support modern life including location-based information services. Research and development in the existing technologies can take a myriad of different directions.

As users become more empowered with the growth of mobile communication technology, new and old paradigms begin to take advantage of this new space. One consumer electronics growth, where mobility is quintessential, is in location based services, such as navigation systems utilizing satellite-based Global Positioning System (GPS) devices. Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest. The real-time information provides invaluable relevant information, when available or in service areas. The relevant information is also invaluable when service is not available as well.

Thus, a need still remains for a navigation system with display control mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a navigation system including: determining a frame of a map based on a current travel-direction for tracking a movement of a first device; generating a directional-tile from the frame based on the current travel-direction; and transferring the directional-tile for displaying a navigation map on a second device using the directional-tile from the first device.

An embodiment of the present invention provides a navigation system, including: a framing module for determining a frame of a map based on a current travel-direction for tracking a movement of a first device; a tiling module, coupled to the framing module, for generating a directional-tile from the frame based on the current travel-direction; and a communication unit, coupled to the tiling module, for transferring the directional-tile for displaying a navigation map on a second device using the directional-tile from the first device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
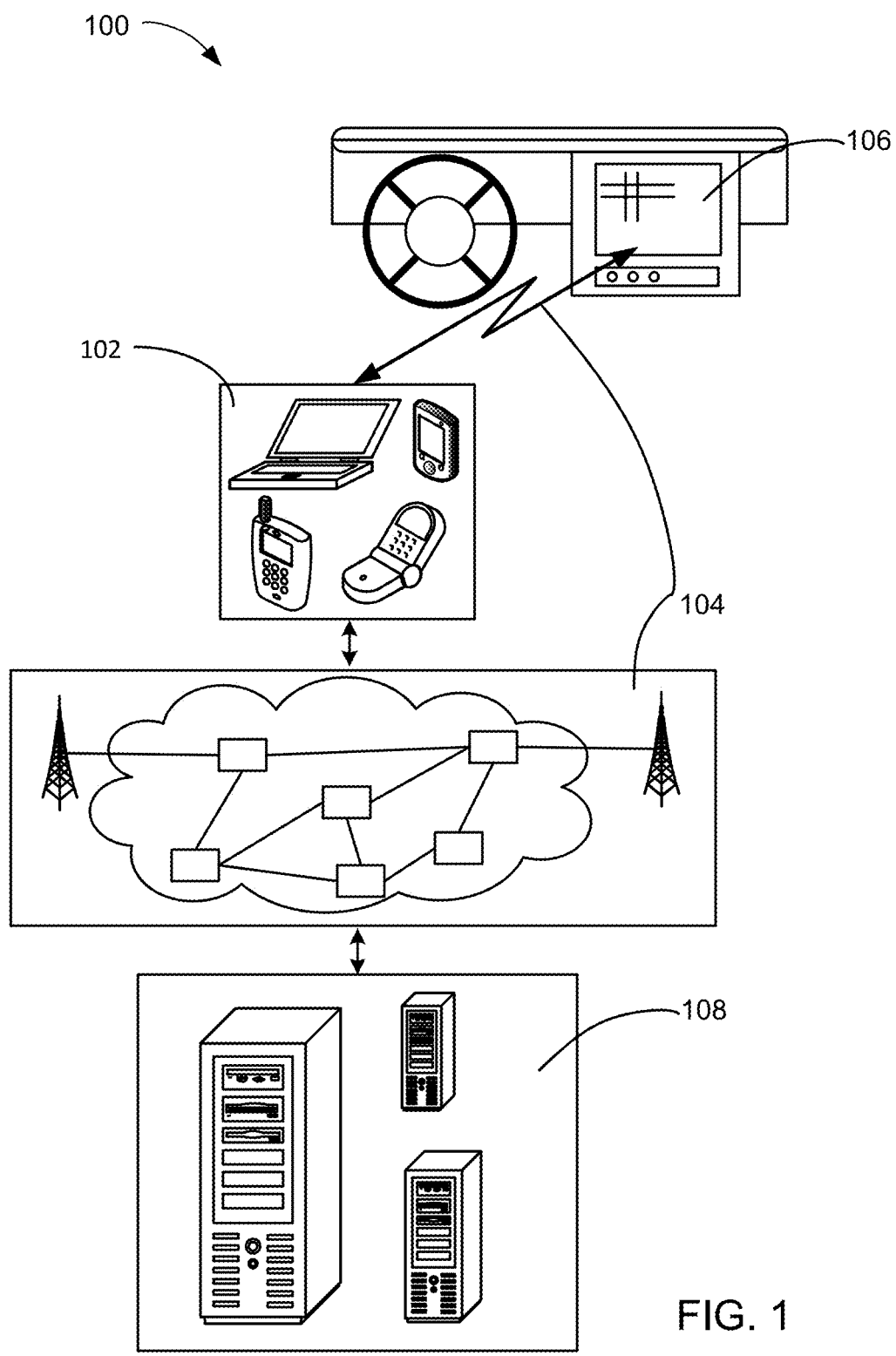
FIG. 1 is a navigation system with display control mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y); where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein can include the navigation information described as well as information relating to points of interest to the user, such as local business, hours of businesses, types of businesses, advertised specials, traffic information, maps, local events, and location based community or personal information.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with display control mechanism in an embodiment of the present invention. The navigation system 100 includes a first device 102, such as a client or a server, connected to a second device 106, such as a client or server. The navigation system 100 can further include a host device 108, such as a client or a server, connected to the first device 102, the second device 106, or a combination thereof. The first device 102, the second device 106, the host device 108, or a combination thereof can communicate using a communication path 104, such as a wireless or wired network.

For example, the first device 102, the second device 106, or a combination thereof can be of any of a variety of devices, such as a cellular phone, personal digital assistant, a notebook computer, automotive telematics navigation system, or other multi-functional mobile communication or entertainment device. The first device 102, the second device 106, or a combination thereof can couple, either directly or indirectly, to the communication path 104 to communicate with each other, the host device 108, or a combination thereof or can be a stand-alone devices. The first device 102, the second device 106, or a combination thereof further be separate form or incorporated with a vehicle, such as a car, truck, bus, or train.

For illustrative purposes, the navigation system 100 is described with the first device 102 as a mobile computing device and the second device 106 as a device incorporated with a vehicle. However, it is understood that the first device 102 and the second device 106 can be different types of devices. For example, the first device 102 can also be a non-mobile computing device, such as a server, a server farm, or a desktop computer and the second device 106 can also be a mobile computing device, such as a laptop or a tablet computer.

The host device 108 can be any of a variety of centralized or decentralized computing devices, or video transmission devices. For example, the host device 108 can be a computer, grid computing resources, a virtualized computer resource, cloud computing resource, routers, switches, peer-to-peer distributed computing devices, or a combination thereof.

The host device 108 can be centralized in a single room, distributed across different rooms, distributed across different geographical locations, embedded within a telecommunications network. The host device 108 can couple with the communication path 104 to communicate with the first device 102, the second device 106, or a combination thereof. The host device 108 can also be a client type device as described for the first device 102.

For illustrative purposes, the navigation system 100 is described with the host device 108 as a non-mobile computing device, although it is understood that the host device 108 can be different types of computing devices. For example, the host device 108 can also be a mobile computing device, such as notebook computer, another client device, or a different type of client device. The host device 108 can be a standalone device, or can be incorporated with a vehicle, such as a car, a truck, a bus, or a train.

Also for illustrative purposes, the navigation system 100 is described with the host device 108 as a computing device, although it is understood that the host device 108 can be different types of devices. Also for illustrative purposes, the navigation system 100 is shown with the first device 102, the second device 106, and the host device 108 as end points of the communication path 104, although it is understood that the navigation system 100 can have a different partition between the first device 102, the second device 106, the host device 108, and the communication path 104. For example, the first device 102, the second device 106, the host device 108, or a combination thereof can also function as part of the communication path 104.

The communication path 104 can span and represent a variety of networks. For example, the communication path 104 can include wireless communication, wired communication, optical, ultrasonic, or the combination thereof. Satellite communication, cellular communication, Bluetooth, near field communication (NFC), Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
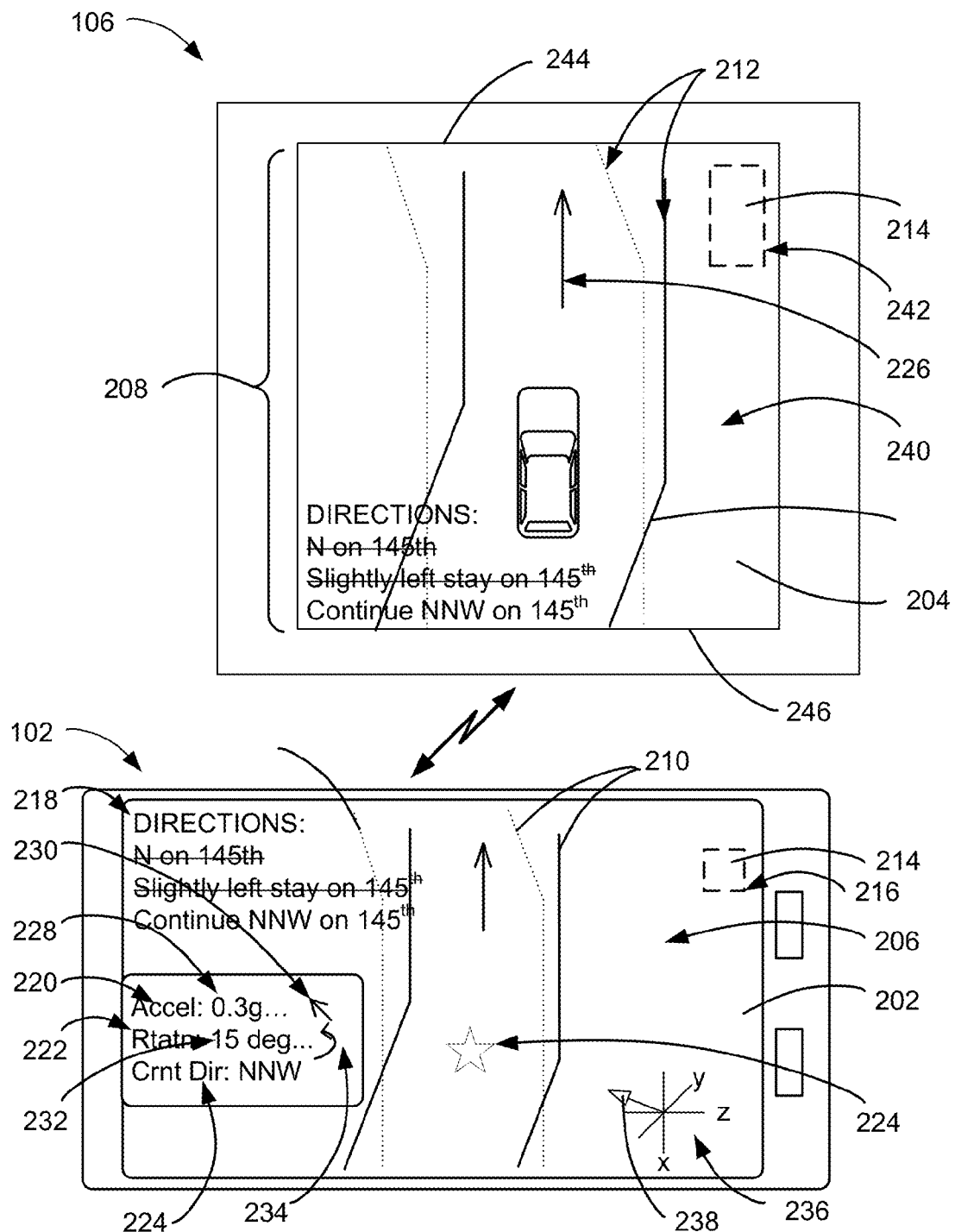
FIG. 2 is an example of a display interface of the first device and a further display of the second device.

Referring now to FIG. 2, therein is shown an example of a display interface 202 of the first device 102 and a further display 204 of the second device 106. The display interface 202 can show a map 206. The map 206 can be a representation of a geographic area.

For example, the map 206 can be a visual representation, a set of written or audible coordinates, such as global positioning system (GPS) coordinates or longitude and latitude coordinates of locations, entities, or a combination thereof within a given geographic area. The map 206 can represent a layout of the given geographic area including a continent, a country, a state or province, a county, a city, a city block, a combination thereof, or a region therein.

The map 206 can include a frame 208. The frame 208 is defined as a portion of the map 206. The frame 208 can be formatted for displaying on devices, such as on the display interface 202 or the further display 204. A size, a shape, a format, or a combination thereof for the frame 208 can be determined by the navigation system 100. Details regarding the frame 208 will be discussed below.

The map 206 can include a rotation set 210 having selections 212 for generating a directional-tile 214. The directional-tile 214 is defined as a portion of the frame 208. The directional-tile 214 can be displayed on various devices, such as on the display interface 202 or the further display 204. The directional-tile 214 can be used to update a portion of the map 206, guidance information, or a combination thereof communicated to a user (not shown).

For example, the directional-tile 214 or a portion therein can be displayed or used to update a displayed portion of the map 206 based on movement of the first device 102, the second device 106, or a combination thereof. Also for example, the directional-tile 214 can be used to maintain a relative direction of the user pointed along a known direction when displaying any portions of the map 206 for the user.

The rotation set 210 is defined as a set of tools for managing orientation of the displayed portion of the frame 208. The rotation set 210 can include methods or processes for rotating the map 206 or a portion thereof according to a heading of the user. The rotation set 210 can include equations, tables, process steps, methods, or a combination thereof predetermined by the navigation system 100 for rotating the map 206 or a portion thereof.

The rotation set 210 can include a set of tiles with each of the selections 212 being an instance of a tile in the set of tiles, which can be selected for generating the directional-tile 214. For example, the rotation set 210 can have two instances of the selections 212. The rotation set 210 can have a "North Up" orientation where navigational north is oriented upward and a "South Up" orientation where navigational south is oriented upward. The navigation system 100 can select either the "North Up" tile or the "South Up" tile for the directional-tile 214.

The rotation set 210 can also include a set of directions, such as 0°-180° or North-East-South-West, and corresponding processes for rotating a display of a portion of the map 206 accordingly. The selections 212 can correspond to individual orientations and the corresponding processes. For example, the rotation set 210 can include instructions or steps for rotating the display of a tile, such as from "North-Up" display to "South-Up" display, to generate the directional-tile 214.

The rotation set 210 can have two, four, eight, or more instances of the selections 212 therein. The rotation set 210 can have instances of tiles or instructions for managing divisions of North-South, North (N)-East (E)-South (S)-West (W), N-NW-W-SW-S-SE-E-NE, or other similar divisions. Details regarding the directional-tile 214 and the rotation set 210 will be discussed below.

The map 206 can include a map-characteristic 216. The map-characteristic 216 is defined as data for displaying visual characteristics of the map 206. The map-characteristic 216 can include size, granularity, color, display format, or a combination thereof.

The display interface 202 can further show a text layer 218. The text layer 218 can be a display format for displaying a letter, a symbol, or a combination thereof. The text layer 218 can be displayed in conjunction with displaying the map 206. The text layer 218 can be displayed separately and over the map 206. For example, the contents of the text layer 218 can remain at a constant location on the display interface 202 while a display of the map can update based on movement of the user.

The display interface 202 can also show status and movement data detected by the navigation system 100. The display interface 202 can show acceleration 220, a rotational movement 222, a current location 224, and a current travel-direction 226. The acceleration 220 is defined as a change in rate or speed along a direction. The acceleration 220 can be a measure of a linear movement or force associated therewith. The acceleration 220 can also include a change in direction of a movement.

The acceleration 220 can include an acceleration-magnitude 228 and an acceleration-heading 230. The acceleration-magnitude 228 can be an amount of change in the rate relative to a direction and the acceleration-heading 230 can be a direction for the change in the rate.

The navigation system 100 can determine the acceleration 220 of a device. The first device 102 can have a component or a functional unit therein, such as an accelerometer, determining the acceleration-magnitude 228 and the acceleration-heading 230 relative to an orientation of the first device 102.

The rotational movement 222 is defined as a change in orientation relative to a known direction. The rotational movement 222 can be relative to a downward direction as defined by gravity. The rotational movement 222 can be a measure of rotational motion along an axis for defining the orientation of the first device 102 relative to a direction of the gravitational force.

The rotational movement 222 can include a rotational-magnitude 232 and a rotational-heading 234. The rotational-magnitude 232 can be an amount of change in the orientation relative to the downward direction and the rotational-heading 234 can be a direction of the change, including a turning axis and direction, such as positive or clockwise.

The navigation system 100 can determine the rotational movement 222 of a device. The first device 102 can have a component or a functional unit therein, such as a gyroscope, determining the rotational-magnitude 232 and the rotational-heading 234 for the first device 102 relative to the downward direction.

The current travel-direction 226 is defined as a direction of movement for a device. The current travel-direction 226 can be the direction of the linear movement of the first device 102. The current travel-direction 226 can be a directional component of a velocity of the first device 102 as determined by the navigation system 100, such as by using GPS coordinates for the first device 102 over time or the acceleration 220 of the first device.

The current travel-direction 226 can represent a direction of travel for the user, the second device 106, or a combination thereof. Details regarding determination of the current travel-direction 226 will be discussed below.

The current location 224 can be a representation of a geographical location of the first device 102. The current location 224 can be represented in various ways. For example, the current location 224 can be coordinates, such as GPS coordinates or longitude and latitude. Also for example, the current location 224 can be an address or a set of landmarks, such as an intersection between roads or a highway exit. For further example, the current location 224 can be represented on a display of the map 206.

The display interface 202 can further show a device orientation 236 and a relative-forward direction 238. The device orientation 236 can be an absolute orientation of the first device 102 or a component therein. For example, an outward-facing portion or side of the display interface 202 can be determined as "back" or "−y" direction.

The relative-forward direction 238 is defined as a determined direction for the user. The relative-forward direction 238 can be based on the user's physical attributes, such as eyes, face, torso, or a combination thereof. The relative-forward direction 238 can be determined based on the device orientation 236, the acceleration 220, the rotational movement 222, the current travel-direction 226, downward direction, or a combination thereof.

The relative-forward direction 238 can be used to distinguish between the user moving forward or backward, and can be further used to update the current travel-direction 226. Details regarding the relative-forward direction 238 will be discussed below.

The navigation system 100 can show elements similar to the ones displayed on the display interface 202 on the further display 204 of the second device 106. The further display 204 can show a navigation map 240. The navigation map 240 is defined as a portion of the map 206 intended for displaying on the further display 204.

The navigation map 240 can be a representation or display of the frame 208 or a portion therein based on movement of the user. The navigation map 240 can be represented or displayed on the further display 204 of the second device 106 using the directional-tile 214.

The navigation map 240 can also include the current location 224, the current travel-direction 226, the text layer 218, or a combination thereof. The navigation map 240 can be displayed to have a vertical component within the current travel-direction 226 oriented in an upward direction. Details regarding the representation or display process for the navigation map 240 will be discussed below.

The display interface 202, the further display 204, or a combination thereof can include a display-characteristic 242. The display-characteristic 242 is defined as physical traits of a display mechanism within a device. The display-characteristic 242 can include a size, a dimension, a granularity, a display format, a color scheme or capability, or a combination thereof. The display-characteristic 242 can be specific to the first device 102 or the second device 106.

The display-characteristic 242 can be different between the first device 102 and the second device 106. The display-characteristic 242 can also be different from the map-characteristic 216. The navigation system 100 can adjust displaying of the map 206 or portions therein based on the display-characteristic 242 of the intended device. Details regarding the adjustment will be discussed below.

The further display 204 can include a screen top-portion 244 and a screen bottom-portion 246. The navigation system 100 can display the navigation map 240 based on movement of the first device 102 while maintaining the current travel-direction 226 pointed toward the screen top-portion 244 and not the screen bottom-portion 246.

For illustrative purposes, the first device 102 has been described as a consumer mobile device for detecting user movement and the second device 106 has been described as a vehicle-integrated device facilitating user travel. However, it is understood that the devices can be of different types. For example, the second device 106 can be a tablet or a smart phone. Also for example, the second device 106 can have a gyroscope and an accelerometer and determine the movement of the second device 106. For further example, the first device 102 can display the navigation map 240.

Figure 3:
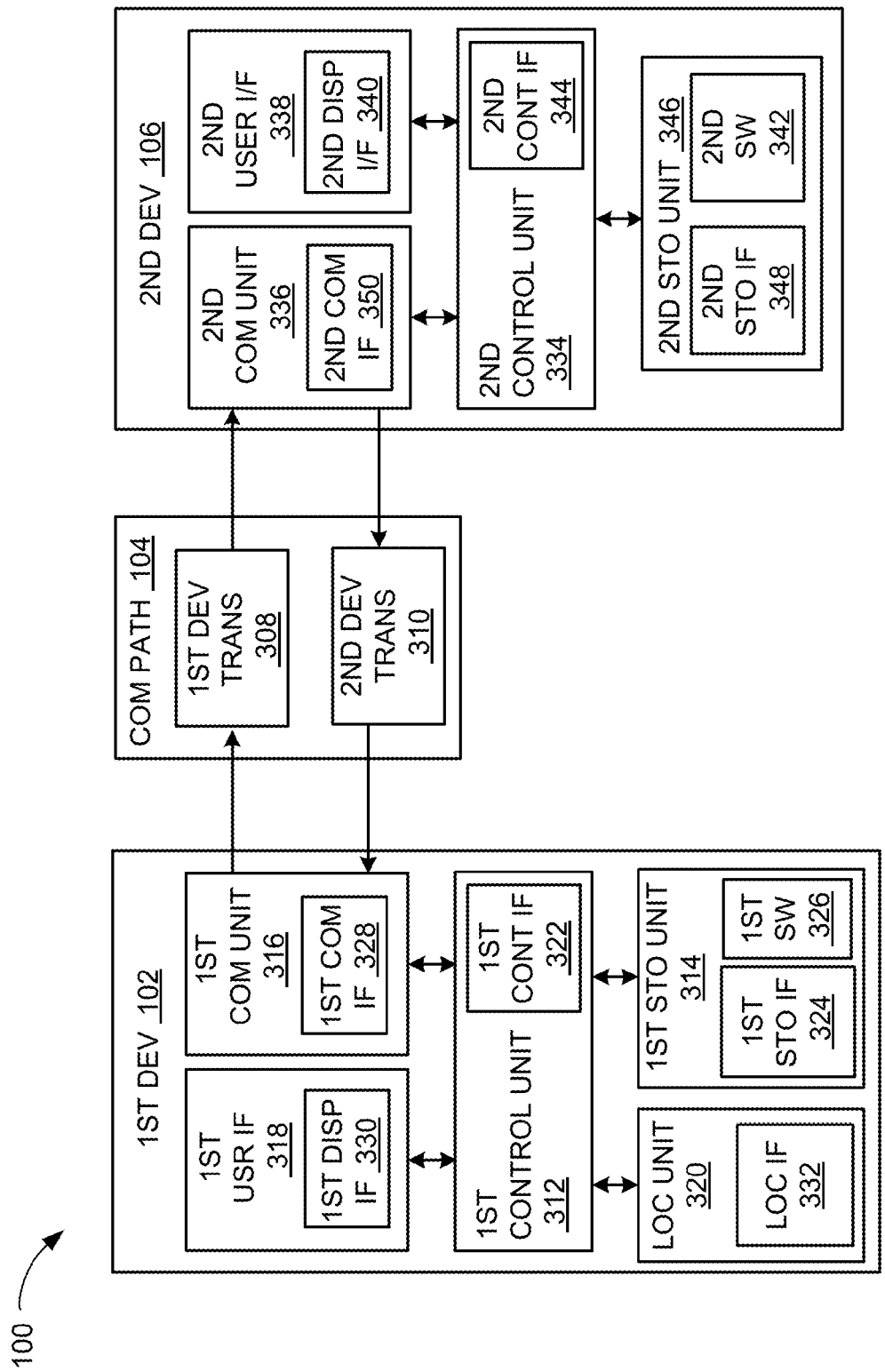
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 and the second device 106 as client devices, although it is understood that the navigation system 100 can have the first device 102 and the second device 106 as different type of devices. For example, the first device 102, the second device 106, or a combination thereof can be a server having a display interface.

For brevity of description in this embodiment of the present invention, the first device 102 and the second device 106 will be described as client devices. The embodiment of the present invention is not limited to this selection for the type of devices. The selection is an example of an embodiment of the present invention.

The first device 102 can include a first control unit 312, a first storage unit 314, a first communication unit 316, and a first user interface 318, and a location unit 320. The first control unit 312 can include a first control interface 322. The first control unit 312 can execute a first software 326 to provide the intelligence of the navigation system 100.

The first control unit 312 can be implemented in a number of different manners. For example, the first control unit 312 can be a processor, an application specific integrated circuit (ASIC), an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as data representing incoming images, data representing previously presented image, sound files, or a combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, the host device 108 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a graphics processing unit (GPU) and a first display interface 330. The first display interface 330 can include a display, a projector, a video screen, a speaker, or any combination thereof. The first display interface 330 can include the display interface 202 of FIG. 2.

The first control unit 312 can operate the first user interface 318 to display information generated by the navigation system 100. The first control unit 312 can also execute the first software 326 for the other functions of the navigation system 100, including receiving location information from the location unit 320. The first control unit 312 can further execute the first software 326 for interaction with the communication path 104 via the first communication unit 316.

The location unit 320 can generate location information, current heading, current acceleration, and current speed of the first device 102, as examples. The location unit 320 can be implemented in many ways. For example, the location unit 320 can function as at least a part of GPS, an inertial navigation system, a cellular-tower location system, a pressure location system, or any combination thereof. Also, for example, the location unit 620 can utilize components such as an accelerometer, a gyroscope, GPS receiver, or a combination thereof.

The location unit 320 can include a location interface 332. The location interface 332 can be used for communication between the location unit 320 and other functional units in the first device 102. The location interface 632 can also be used for communication external to the first device 102.

The location interface 332 can receive information from the other functional units or from external sources, or can transmit information to the other functional units or to external destinations. The external sources and the external destinations refer to sources and destinations external to the first device 102.

The location interface 332 can include different implementations depending on which functional units or external units are being interfaced with the location unit 320. The location interface 332 can be implemented with technologies and techniques similar to the implementation of the first control unit 312.

The second device 106 can be optimized for implementing an embodiment of the present invention in a multiple device embodiment with the first device 102. The second device 106 can provide the additional or higher performance processing power compared to the first device 102. The second device 106 can also provide optimized display interface compared to the first device 102, such as a bigger screen or a higher definition. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, touch screen, soft-keys, a keyboard, a microphone, or any combination thereof to provide data and communication inputs. Examples of the output device of the second user interface 338 can include a second graphics processing unit and a second display interface 340. The second display interface 340 can include a display, a projector, a video screen, a speaker, or any combination thereof. The second display interface 340 can also include the further display 204 of FIG. 2.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102, the host device 108, or a combination thereof over the communication path 104.

The second control unit 334 can be implemented in a number of different manners. For example, the second control unit 334 can be a processor, an application specific integrated circuit (ASIC), an embedded processor, a microprocessor, hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the such as data representing incoming images, data representing previously presented image, sound files, or a combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as nonvolatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof.

The first device 102, the second device 106, or a combination thereof can similarly communicate and interact with the host device 108. Details for the host device 108 will be described below.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106, the host device 108, and the communication path 104.

The functional units in the second device 106 can work individually and independently of the other functional units. The second device 106 can work individually and independently from the first device 102, the host device 108, and the communication path 104.

For illustrative purposes, the navigation system 100 is described by operation of the first device 102 and the second device 106. It is understood that the first device 102, the second device 106, and the host device 108 can operate any of the modules and functions of the navigation system 100.

Figure 4:
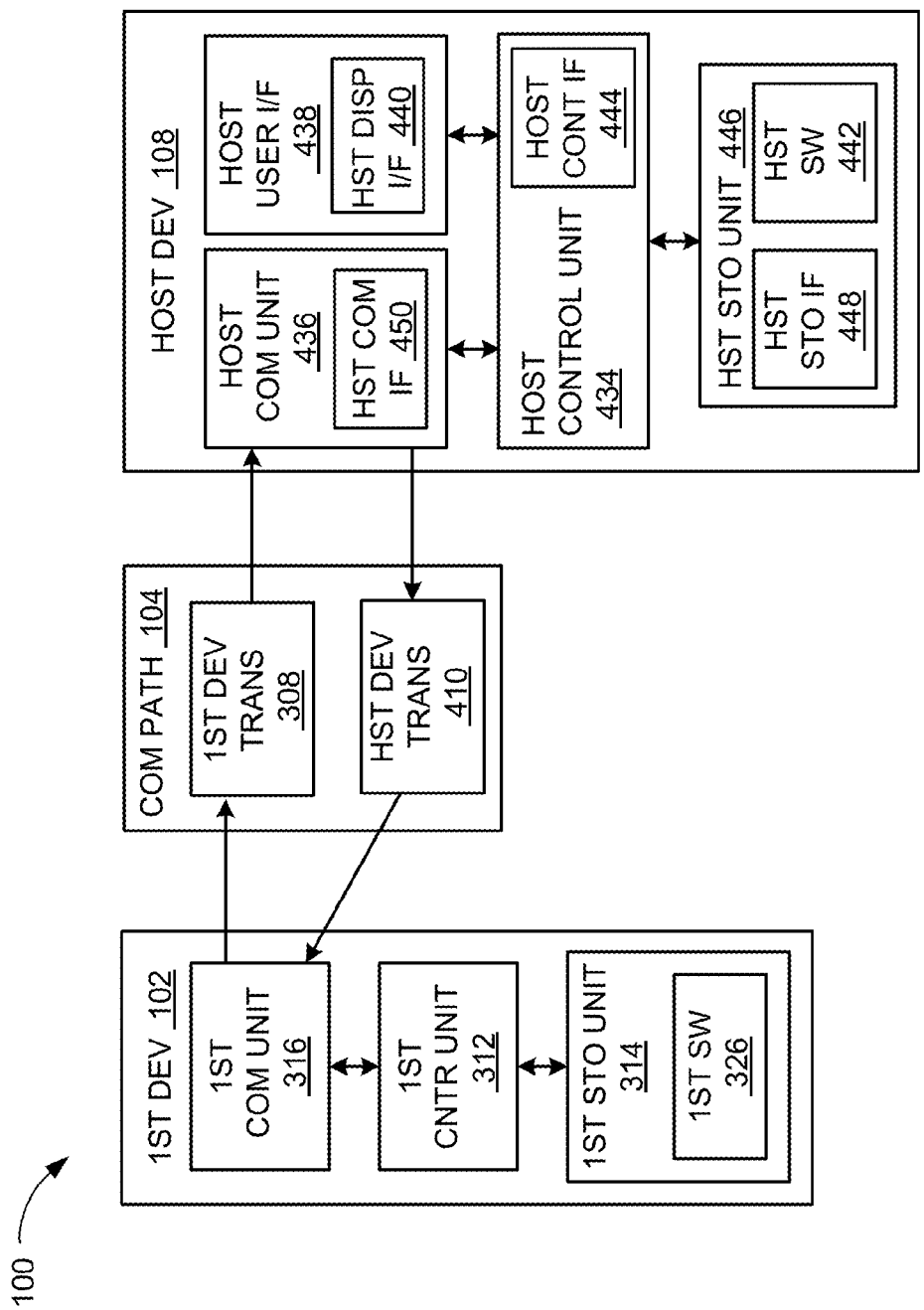
FIG. 4 is a further exemplary block diagram of the navigation system.

Referring now to FIG. 4, therein is shown a further exemplary block diagram of the navigation system 100. Along with the first device 102 and the second device 106 of FIG. 3, the navigation system 100 can include the host device 106. The first device 102 can send information in the first device transmission over the communication path 104 to the host device 108. The host device 108 can send information in a host device transmission 410 over the communication path 104 to the first device 102.

For illustrative purposes, the navigation system 100 is shown with the host device 108 as a server, although it is understood that the navigation system 100 can have the host device 108 as a different type of device. For example, the host device 108 can be a client device.

Also for illustrative purposes, the navigation system 100 is shown with the first device 102 communicating with the host device 108. However, it is understood that the second device 106 can also communicate with the host device 108 in a similar manner as the communication between the first device 102 and the host device 108, between the first device 102 and the second device 106, or a combination thereof.

For brevity of description in this embodiment of the present invention, the host device 108 will be described as a server device. The embodiment of the present invention is not limited to this selection for the type of devices. The selection is an example of an embodiment of the present invention.

The host device 108 can be optimized for implementing an embodiment of the present invention in a multiple device embodiment with the first device 102. The host device 108 can provide the additional or higher performance processing power compared to the first device 102, the second device 106, or a combination thereof. The host device 108 can include a host control unit 434, a host communication unit 436, and a host user interface 438.

The host user interface 438 allows a user (not shown) to interface and interact with the host device 108. The host user interface 438 can include an input device and an output device. Examples of the input device of the host user interface 438 can include a keypad, a touchpad, touch screen, softkeys, a keyboard, a microphone, or any combination thereof to provide data and communication inputs. Examples of the output device of the host user interface 438 can include a host display interface 440. The host display interface 440 can include a display, a projector, a video screen, a speaker, or any combination thereof.

The host control unit 434 can execute a host software 442 to provide the intelligence of the host device 108 of the navigation system 100. The host software 442 can operate in conjunction with the first software 326, the second software 342 of FIG. 3, or a combination thereof. The host control unit 434 can provide additional performance compared to the first control unit 312.

The host control unit 434 can operate the host user interface 438 to display information. The host control unit 434 can also execute the host software 442 for the other functions of the navigation system 100, including operating the host communication unit 436 to communicate with the first device 102, the second device 106, or a combination thereof over the communication path 104.

The host control unit 434 can be implemented in a number of different manners. For example, the host control unit 434 can be a processor, an application specific integrated circuit (ASIC), an embedded processor, a microprocessor, hardware control logic, a hardware finite state machine (FSM), a digital signal processor (DSP), or a combination thereof.

The host control unit 434 can include a host controller interface 444. The host controller interface 444 can be used for communication between the host control unit 434 and other functional units in the host device 108. The host controller interface 444 can also be used for communication that is external to the host device 108.

The host controller interface 444 can receive information from the other functional units or from external sources, or can transmit information to the other functional units or to external destinations. The external sources and the external destinations refer to sources and destinations external to the host device 108.

The host controller interface 444 can be implemented in different ways and can include different implementations depending on which functional units or external units are being interfaced with the host controller interface 444. For example, the host controller interface 444 can be implemented with a pressure sensor, an inertial sensor, a microelectromechanical system (MEMS), optical circuitry, waveguides, wireless circuitry, wireline circuitry, or a combination thereof.

A host storage unit 446 can store the host software 442. The host storage unit 446 can also store the such as data representing incoming images, data representing previously presented image, sound files, or a combination thereof. The host storage unit 446 can be sized to provide the additional storage capacity to supplement the first storage unit 314.

For illustrative purposes, the host storage unit 446 is shown as a single element, although it is understood that the host storage unit 446 can be a distribution of storage elements. Also for illustrative purposes, the navigation system 100 is shown with the host storage unit 446 as a single hierarchy storage system, although it is understood that the navigation system 100 can have the host storage unit 446 in a different configuration. For example, the host storage unit 446 can be formed with different storage technologies forming a memory hierarchal system including different levels of caching, main memory, rotating media, or off-line storage.

The host storage unit 446 can be a volatile memory, a nonvolatile memory, an internal memory, an external memory, or a combination thereof. For example, the host storage unit 446 can be a nonvolatile storage such as nonvolatile random access memory (NVRAM), Flash memory, disk storage, or a volatile storage such as static random access memory (SRAM).

The host storage unit 446 can include a host storage interface 448. The host storage interface 448 can be used for communication between other functional units in the host device 108. The host storage interface 448 can also be used for communication that is external to the host device 108.

The host storage interface 448 can receive information from the other functional units or from external sources, or can transmit information to the other functional units or to external destinations. The external sources and the external destinations refer to sources and destinations external to the host device 108.

The host storage interface 448 can include different implementations depending on which functional units or external units are being interfaced with the host storage unit 446. The host storage interface 448 can be implemented with technologies and techniques similar to the implementation of the host controller interface 444.

The host communication unit 436 can enable external communication to and from the host device 108. For example, the host communication unit 436 can permit the host device 108 to communicate with the first device 102, the second device 106, or a combination thereof over the communication path 104.

The host communication unit 436 can also function as a communication hub allowing the host device 108 to function as part of the communication path 104 and not limited to be an end point or terminal unit to the communication path 104. The host communication unit 436 can include active and passive components, such as microelectronics or an antenna, for interaction with the communication path 104.

The host communication unit 436 can include a host communication interface 450. The host communication interface 450 can be used for communication between the host communication unit 436 and other functional units in the host device 108. The host communication interface 450 can receive information from the other functional units or can transmit information to the other functional units.

The host communication interface 450 can include different implementations depending on which functional units are being interfaced with the host communication unit 436. The host communication interface 450 can be implemented with technologies and techniques similar to the implementation of the host controller interface 444.

The first communication unit 316 can couple with the communication path 104 to send information to the host device 108 in the first device transmission 308. The host device 108 can receive information in the host communication unit 436 from the first device transmission 308 of the communication path 104.

The host communication unit 436 can couple with the communication path 104 to send information to the first device 102 in the host device transmission 410. The first device 102 can receive information in the first communication unit 316 from the host device transmission 410 of the communication path 104. The navigation system 100 can be executed by the first control unit 312, the host control unit 434, or a combination thereof. The second device 106 can similarly communicate and interact with the host device 108 using the corresponding units and functions therein.

For illustrative purposes, the host device 108 is shown with the partition having the host user interface 438, the host storage unit 446, the host control unit 434, and the host communication unit 436, although it is understood that the host device 108 can have a different partition. For example, the host software 442 can be partitioned differently such that some or all of its function can be in the host control unit 434 and the host communication unit 436. Also, the host device 108 can include other functional units not shown in FIG. 4 for clarity.

The functional units in the host device 108 can work individually and independently of the other functional units. The host device 108 can work individually and independently from the first device 102, the second device 106, and the communication path 104.

For illustrative purposes, the navigation system 100 is described by operation of the first device 102 and the host device 108. It is understood that the first device 102, the second device 106, and the host device 108 can operate any of the modules and functions of the navigation system 100.

Figure 5:
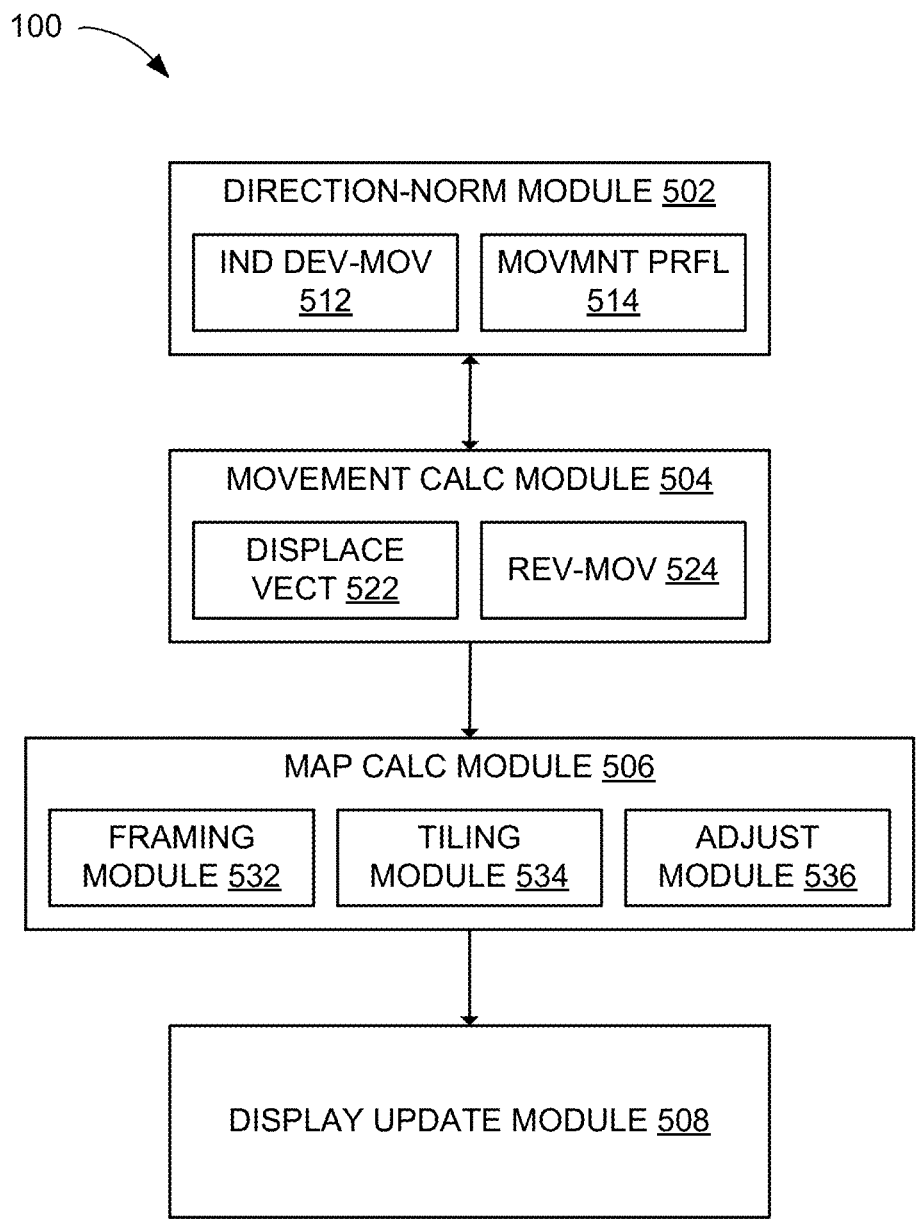
FIG. 5 is a control flow of the navigation system.

Referring now to FIG. 5, therein is shown a control flow of the navigation system 100. The navigation system 100 can include a direction-normalization module 502, a movement calculation module 504, a map calculation module 506, and a display update module 508.

The direction-normalization module 502 can be coupled to the movement calculation module 504 using wired or wireless connections, by having an output of one module as an input of the other module, by having operations of one module influence operation of the other module, or a combination thereof. Similarly, the movement calculation module 504 can be coupled to the map calculation module 506 and the map calculation module 506 can be coupled to the display update module 508.

The direction-normalization module 502 is for determining a direction the user is facing. The direction-normalization module 502 can determine the user's movement by determining the relative-forward direction 238 of FIG. 2 for the user relative to the device orientation 236 of FIG. 2.

The direction-normalization module 502 can determine the relative-forward direction 238 using the first user interface 318 of FIG. 3. The direction-normalization module 502 can use a camera to determine a location and an orientation of the user's eyes, face, torso, or a combination thereof. The direction-normalization module 502 can determine the direction the user's eyes, face, torso, or a combination thereof is facing as the relative-forward direction 238.

For example, the direction-normalization module 502 can determine a plane and a line across known points on the user's body, such as eyes, shoulders, hips, edge points of the lips, ears, or a combination thereof. The direction-normalization module 502 can determine a direction orthogonal to the line between the known points and along the plane including the known points as the relative-forward direction 238.

The direction-normalization module 502 can represent the relative-forward direction 238 using the device orientation 236. For example, if the user is directly in front of and facing the display interface 202 of FIG. 2 with the first device 102 of FIG. 1 oriented perpendicular to the ground and rotated 90° counter-clockwise as shown in FIG. 2, the relative-forward direction 238 can be the positive y direction of the device orientation 236 as shown in FIG. 2.

The direction-normalization module 502 can also determine the relative-forward direction 238 using the downward direction as determined by the location unit 320 of FIG. 3. The direction-normalization module 502 can determine the direction of the gravitational force using the location unit 320. The direction-normalization module 502 can determine the downward direction as the direction of the gravitational force. The direction-normalization module 502 can determine the relative-forward direction 238 to be orthogonal to the downward direction.

The direction-normalization module 502 can also calculate the relative-forward direction 238 using the acceleration 220 of FIG. 2 of the first device 102. The direction-normalization module 502 can use the location unit 320 to determine the acceleration-magnitude 228 of FIG. 2, the acceleration-heading 230 of FIG. 2, or a combination thereof.

The direction-normalization module 502 can assume that the user will mostly move in the relative-forward direction 238. The direction-normalization module 502 can determine the relative-forward direction 238 as the acceleration-heading 230 of occurring most frequently over a period of time predetermined by the navigation system 100.

For example, the direction-normalization module 502 can add or integrate all of the acceleration-magnitude 228 according to the acceleration-heading 230 during the previous minute, five minutes, an hour, or a combination thereof. The direction-normalization module 502 can set the direction of the resulting vector as the relative-forward direction 238.

The direction-normalization module 502 can use the acceleration 220 stored in the first storage unit 314 of FIG. 3, the second storage unit 346 of FIG. 3, the host storage unit 446 of FIG. 4, or a combination thereof to determine the relative-forward direction 238. The direction-normalization module 502 can use the first control unit 312 of FIG. 3, the second control unit 334 of FIG. 3, the host control unit 434 of FIG. 4, or a combination thereof to process the above described data and determine the relative-forward direction 238.

The direction-normalization module 502 can the first control unit 312, the second control unit 334, the host control unit 434, or a combination thereof to further determine an independent device-movement 512. The independent device-movement 512 is defined as an indication of change in location or orientation of the first device 102 relative to the user. The independent device-movement 512 can be represented by a Boolean value or vectors representing the movement of the first device 102 relative to the user.

The direction-normalization module 502 can determine the independent device-movement 512 using the first user interface 318. For example, the direction-normalization module 502 can use the first user interface 318 to determine the independent device-movement 512 when the image observed on a camera therein changes. The direction-normalization module 502 can adjust the relative-forward direction 238 by re-determining the relative-forward direction 238 as described above.

The direction-normalization module 502 can further determine the independent device-movement 512 using a movement profile 514. The movement profile 514 is defined as a set of movement data typical for different types of movement.

The movement profile 514 can include frequency, magnitude, pattern, typically observed by the first device 102 for different types of movement by the user, such as walking, running, walking up steps, traveling in a vehicle, utilizing an apparatus, or a combination thereof. The movement profile 514 can further include data typical for user jumping, falling, or slipping, being involved in a vehicle accident, picking up the phone, dropping the phone, or a combination thereof.

The movement profile 514 can include thresholds for determining the independent device-movement 512. For example, the movement profile 514 can have thresholds for identifying the acceleration 220, the rotational movement 222 of FIG. 2, a frequency of change thereof, or a combination thereof exceeding the thresholds as when user drops the first device 102 or when the user is pulling the first device out of the user's pocket or bag.

The movement profile 514 can include ranges for determining the independent device-movement 512. For example, the movement profile 514 can have ranges of values for the acceleration 220, the rotational movement 222, or a combination thereof typical for driving, vehicle maneuvers, such as turning or stopping, user movements, user manipulation of the first device 102, or a combination thereof.

The direction-normalization module 502 can determine the independent device-movement 512 by assigning the appropriate Boolean value when the acceleration 220, the rotational movement 222, or a combination thereof matches, exceeds, is in range of, or a combination thereof as specified by the movement profile 514. The direction-normalization module 502 can further determine the independent device-movement 512 by setting the independent device-movement 512 as the acceleration 220, the rotational movement 222, or a combination thereof matching, exceeding, is in range of, or a combination thereof as specified by the movement profile 514.

The direction-normalization module 502 can use the relative-forward direction 238, the independent device-movement 512, the acceleration 220, the rotational movement 222, or a combination thereof to calculate the current travel-direction 226 of FIG. 2 for tracking a movement of the first device 102, the second device 106, or a combination thereof.

The direction-normalization module 502 can use the first device 102, the second device 106, the host device 108 of FIG. 1, or a combination thereof to calculate the current travel-direction 226. For example, the direction-normalization module 502 can use the first control unit 312, the second control unit 334, the host control unit 436, or a combination thereof. Also for example, the direction-normalization module 502 can use only the first device 102 to calculate the current travel-direction 226.

The direction-normalization module 502 can calculate the current travel-direction 226 by initializing the current travel-direction 226 as the value or vector for the relative-forward direction 238. The direction-normalization module 502 can continue with the assumption that the user will mostly travel in the relative-forward direction 238. As such, the orientation of the first device 102 used to determine the relative-forward direction 238 can also be relative to the current travel-direction 226.

The direction-normalization module 502 can further calculate the current travel-direction 226 by adding or integrating the acceleration 220, the rotational movement 222, or a combination thereof over a time period predetermined by the navigation system 100. For example, the direction-normalization module 502 can determine the current travel-direction 226 to be the direction of the vector resulting from adding or integrating the instances of the acceleration 220, the rotational movement 222, or a combination thereof occurring in the preceding one, five, or thirty minutes, an hour, or a combination thereof.

The direction-normalization module 502 can ignore the acceleration 220, the rotational movement 222, or a combination thereof in calculating the current travel-direction 226 when the independent device-movement 512 is "TRUE". The direction-normalization module 502 can alternatively subtract the independent device-movement 512 from the acceleration 220, the rotational movement 222, or a combination thereof and use the result of the subtraction to calculate the current travel-direction 226.

The direction-normalization module 502 can use the first control interface 322 of FIG. 3, the second control interface 344 of FIG. 3, the host control interface 444 of FIG. 4, or a combination thereof to access the acceleration 220, the rotational movement 222, or a combination thereof. The direction-normalization module 502 can store the relative-forward direction 238, the current travel-direction 226, or a combination thereof in the first storage unit 314, the second storage unit 346, the host storage unit 446, or a combination thereof.

After determining the relative-forward direction 238, the current travel-direction 226, or a combination thereof, the control flow can pass from the direction-normalization module 502 to the movement calculation module 504. The control flow can pass by having the relative-forward direction 238, the current travel-direction 226, or a combination thereof as an output from the direction-normalization module 502 to an input of the movement calculation module 504, storing the relative-forward direction 238, the current travel-direction 226, or a combination thereof at a location known and accessible to the movement calculation module 504, by notifying the movement calculation module 504, such as by using a flag, an interrupt, a status signal, or a combination thereof, or a combination of processes thereof.

The movement calculation module 504 is for calculating a geographical displacement of the user to track a movement of the user. The movement calculation module 504 can calculate the geographical displacement by calculating a displacement vector 522 of the travel for the first device 102, the second device 106, or a combination thereof. The displacement vector 522 can include a magnitude or amount of displacement and a direction of displacement.

The movement calculation module 504 can calculate the displacement vector 522 by summing, integrating, or a combination of operations thereof using the acceleration 220, the rotational movement 222, or a combination thereof with respect to time duration for the acceleration 220, the rotational movement 222, or a combination thereof. The movement calculation module 504 can access the location unit 320 for determining the acceleration 220, the rotational movement 222, or a combination thereof.

For example, the movement calculation module 504 can integrate the acceleration 220 over time to calculate the displacement, use the rotational movement 222 to adjust the direction of the displacement, combine the components of the displacement over time, or a combination thereof. The movement calculation module 504 can further adjust the displacement vector 522 by subtracting or ignoring the independent device-movement 512 from the acceleration 220, the rotational movement 222, or a combination thereof.

The movement calculation module 504 can further determine various states representing vehicular maneuvers, such as a turn or a lane change, user-specific movements or maneuvers, or a combination thereof. The movement calculation module 504 can use the determined states in conjunction with the acceleration 220, the rotational movement 222, or a combination thereof and the corresponding time duration to calculate the displacement vector 522.

The movement calculation module 504 can also use positional component of the navigation information, such as the GPS coordinates or the longitude-latitude information, from the location unit 320. For example, the movement calculation module 504 can calculate the displacement vector 522 using the current location 224 of FIG. 2 and a previous instance thereof.

The movement calculation module 504 can also use the displacement vector 522, the acceleration 220, the rotational movement 222, various determined states, or a combination thereof to determine the current location 224. For example, the movement calculation module 504 can add the displacement vector 522 to the previous instance of the current location 224 to update the current location 224 between positional updates or when positioning functions of the location unit 320 is not available, such as when GPS signals or cellular signals are not available or unreliable.

The movement calculation module 504 can determine a reverse-movement 524. The reverse-movement 524 is defined as an indication of movement in a direction opposite to a forward direction relative to the user. The direction-normalization module 502 can determine the reverse-movement 524, such as when a user is walking backwards or driving a vehicle in reverse, when the displacement vector 522 includes a component in a direction opposite to the relative-forward direction 238.

For example, the movement calculation module 504 can determine the reverse-movement 524 when the acceleration 220 includes a directional component opposite to the relative-forward direction 238 following a determined stopped state or zero velocity for the first device 102. Also for example, the movement calculation module 504 can use inputs from the second device 106 to determine the reverse-movement 524, such as an indication that a gear selection for a vehicle is for travelling in reverse.

The navigation system 100 can assume that the user has the first device 102 on their person. Thus, the displacement vector 522, the position, the acceleration 220, the rotational movement 222, or a combination thereof detected, determined, or calculated for the first device 102 can be assumed to be identical to that of the user.

Further, the displacement vector 522, the position, the acceleration 220, the rotational movement 222, or a combination thereof can be attributed to the second device 106 when the user is operating a vehicle having the second device 106 integrated therein. The navigation system 100 can identify when the user is operating the vehicle with the second device 106 by recognizing when the first device 102 communicates or links to the second device 106, such as using Blue Tooth or NFC.

After calculating the displacement vector 522, determining the reverse-movement 524, or a combination thereof, the direction-normalization module 502 can pass the results to the direction-normalization module 502. The direction-normalization module 502 can further use the results to adjust the relative-forward direction 238, the current travel-direction 226, or a combination thereof. For example, the direction-normalization module 502 can adjust the current travel-direction 226, the relative-forward direction 238, or a combination thereof when the reverse-movement 524 is maintained for more than a duration predetermined by the navigation system 100.

Also after calculating the displacement vector 522, determining the reverse-movement 524, or a combination thereof, the control flow can pass from the movement calculation module 504 to the map calculation module 506. The control flow can pass in a manner similar to the manner described above from the direction-normalization module 502 to the movement calculation module 504. The control flow can also pass at regular intervals, such as after a preset duration or after a preset number of samples from the location unit 320 as prescribed by the navigation system 100.

The map calculation module 506 is for displaying the map 206 of FIG. 2 or portions thereof. The map calculation module 506 can display the map 206 or portions thereof on the first device 102, the second device 106, or a combination thereof. The map calculation module can display based on the current location 224, the movement of the first device 102, or a combination thereof. The map calculation module 506 can include a framing module 532, a tiling module 534, and an adjustment module 536 for displaying the map 206.

The framing module 532 is for determining the frame 208 of FIG. 2 of the map 206. The framing module 532 can determine the frame 208 based on the current travel-direction 226, the current location 224, the displacement vector 522, the acceleration 220, the rotational movement 222, or a combination hereof. The frame 208 can be used to track and display a movement of the user relative to the map 206.

The framing module 532 can determine the frame 208 by selecting an area in the map 206 corresponding to locations surrounding the current location 224. The framing module 532 can have a size, a division, a shape, or a combination thereof for selecting the area around a location in the map 206 corresponding to the current location 224. The size, the division, such as cells or regions, the shape, or a combination thereof for selecting the area can be determined by the navigation system 100.

The framing module 532 can further determine the frame 208 based on the current travel-direction 226. The framing module 532 can include more of area along the current travel-direction 226 instead of selecting an area with the current location 224 in the center. For example, if the user is traveling north, the framing module 532 can determine the frame 208 to include more of the area north of the current location 224 within a given size for the frame 208 and have the current location 224 included in the lower half of the frame 208.

The framing module 532 can use the first device 102, the second device 106, the host device 108 or a combination thereof to determine the frame 208. For example, the framing module 532 can use the first communication unit 316 of FIG. 3, the second communication unit 336 of FIG. 3, the host communication unit 436 of FIG. 4, or a combination thereof to send and receive the map 206 between the devices. The framing module 532 can use the first control unit 312, the second control unit 334, the host control unit 434, or a combination thereof to determine the frame 208 from the map 206.

The framing module 532 can also use only the first device 102 to determine the frame 208. The framing module 532 can use the first storage interface 324 of FIG. 3 to access the map 206 stored in the first storage unit 324. The framing module 532 can use the first control unit 312 to determine the frame 208 from the map 206.

The tiling module 534 is for generating an appropriate portion of the map 206 for updating a display based on movement of the user. The tiling module 534 can generate the appropriate portion by generating the directional-tile 214 of FIG. 2.

The tiling module 534 can generate the directional-tile 214 by processing or selecting the rotation set 210 of FIG. 2 corresponding to a portion of the frame 208 ahead of the current location 224 according to the current travel-direction 226. The tiling module 534 can use the process step, method, equations, or a combination thereof included in the rotation set 210 to rotate the directional-tile 214 to have a upward direction on the directional-tile 214 is parallel with the current travel-direction 226.

The tiling module 534 can select the directional-tile 214 as the tile having an orientation of the top portion parallel with a directional component of the current travel-direction 226. When the rotation set 210 includes more than two tiles, the tiling module 534 can generate the directional-tile 214 by selecting the tile having the orientation of the top portion closest to the current travel-direction 226.

The tiling module 534 can also generate the directional-tile 214 by rotating a portion of the map 206 according to the rotation set 210. For example, the tiling module 534 can rotate the frame 208 such that the current travel-direction 226 would point upward on a display. The tiling module 534 can use the rotational amounts, equations, processes, or a combination thereof included in the rotation set 210 to rotate the frame 208. The tiling module 534 can then generate the directional-tile 214 by selecting a portion of the frame ahead of the current location 224 according to the current travel-direction 226.

Also for example, the tiling module 534 can select the rotation set 210 corresponding to an area ahead of the current location 224 according to the current travel-direction 226. The tiling module 534 can rotate the display of the selected area according to rotational amounts, equations, processes, or a combination thereof included in the rotation set 210 matching an orientation closest to the current travel-direction 226.

For a more specific example, the tiling module 534 can generate the directional-tile 214 from the rotation set 210 having two, four, eight or more selections for controlling display of the map 206. The tiling module 534 can calculate the difference between the current travel-direction 226 and the upward directions for each of the selections in the rotation set 210. The tiling module 534 can generate the directional-tile 214 using the selection within the rotation set 210 having the smallest difference between the associated upward direction and the current travel-direction 226.

The tiling module 534 can further generate the directional-tile 214 from the frame 208 based on the current travel-direction 226 and the reverse-movement 524. The tiling module 534 can withhold generating the directional-tile 214 for a duration predetermined by the navigation system 100 when the reverse-movement 524 is determined by the navigation system 100. After the predetermined duration, the tiling module 534 can generate the directional-tile 214 behind the current location 224 according to the current travel-direction 226.

The tiling module 534 can also process the directional-tile 214 separate from or before the text layer 218 of FIG. 2. The tiling module 534 can perform the rotations or selections for the directional-tile 214 and lay the text layer 218 over the direction-tile 214.

Alternatively, the tiling module 534 can be configured to use the area ahead of the current location 224 as described above. The persisting backward motion can be used to update the current travel-direction 226 as described above for the direction-normalization module 502 and the movement calculation module 504. After the update, the current travel-direction 226 can reflect the backward motion and the tiling module 534 can generate the directional-tile 214 for the appropriate area for the current travel-direction 226 and the reverse-movement 524.

The adjustment module 536 is for adjusting the directional-tile 214 based on the map-characteristic 216 of FIG. 2, the display-characteristic 242 of FIG. 2, or a combination thereof. The adjustment module 536 can adjust color, sizing, definition, format, or a combination thereof based on the display-characteristic 242 of the intended display interface to maintain the map-characteristic 216 when displayed.

For example, the adjustment module 536 can adjust the color, the size, the definition, the display format, or a combination thereof for the directional-tile 214 to have the directional-tile 214 displayed as intended according to the map-characteristic 216. The adjustment module 536 can adjust the directional-tile 214 for displaying on the first device 102, the second device 106, the host device 108 or a combination thereof.

For a more specific example, the adjustment module 536 can adjust the directional-tile 214 using the first device 102 for displaying on the second device 106. The adjustment module 536 can use the first control unit 312 to adjust the directional-tile 214 and use the first communication unit 316, the second communication unit 336, the second user interface 338, or a combination thereof to display the directional-tile 214.

Continuing with the example, the map calculation module 506 can transferring the directional-tile 214 for displaying the navigation map 240 of FIG. 2 on the second device 106 using the directional-tile 214 from the first device 102. The map calculation module 506 can transferring the directional-tile 214 by using the first communication unit 316, the second communication unit 336, the host communication unit 436, or a combination thereof to transmit, receive, or a combination of processes thereof regarding the directional-tile 214.

Continuing with the example, the navigation map 240 can be generated based on the directional-tile 214 using the second user interface 338, the second control unit 334, or a combination thereof. Based on the use of the directional-tile 214, the navigation map 240 can have the current travel-direction toward the screen top-portion 244 of FIG. 2 and not pointed toward the screen bottom-portion 246 of FIG. 2.

Also as an example, the map calculation module 506 can generate the navigation map 240 using the first control unit 312, the first user interface 318, the second user interface 338, the second control unit 334, the host control unit 434, the host user interface 438, or a combination thereof based on the directional-tile 214. The map calculation module 506 can transfer the navigation map 240 having the directional-tile 214 integrated therein to the first device 102, the second device 106, the host device 108, or a combination thereof.

The control flow can pass from the map calculation module 506 to the display update module 508 in a manner similar to the manner between the direction-normalization module 502 and the movement calculation module 504. The display update module 508 is for displaying the navigation map 240.

When the map calculation module 506 transfers the directional-tile 214, the display update module 508 can generate the navigation map 240. The display update module 508 can generate the project-map 206 by moving a portion of the previously displayed portion of the map 206 downward and displaying the directional-tile 214 above the corresponding portion.

For example, the display update module 508 can use the second control unit 334, the second user interface 338, or a combination thereof to move the previously displayed portion of the map 206 and display the directional-tile 214. Also for example, the display update module 508 can the second control unit 334, the second user interface 338, or a combination thereof to update only portions of the navigation map 240 without recalculating or regenerating an entire display of the screen.

It has been discovered that generating the map 206 or the frame 208 in the first device 102 and sending the directional-tile 214 from the first device 102 to the second device 106 reduces processing burden and increases efficiency for the navigation system 100. The first device 102 can generate one whole frame and supply that in tile-by-tile basis to the second device 106. The second device 106 can show partial tile, receive the tiles only on on-demand basis, or a combination thereof, which reduces the need to generate a whole new image for displaying on the second device 106.

Based on generating the frame 208 in the first device 102, the navigation system 100 can provide guidance even when both the first device 102 and the second device 106 not connected to the host device 108. For example, the first device 102 can use acceleration, velocity, durations for acceleration or velocity, or a combination thereof to determine the location of the first device 102 and use the rest of the frame 208 to continue providing guidance for the user.

When the map calculation module 506 transfers the navigation map 240, the display update module 508 can remove the previously displayed portion of the map 206 and display the navigation map 240. For example, the display update module 508 can use the second communication unit 336 of FIG. 3 to receive the navigation map 240. The display update module 508 can use the second control unit 334, the second user interface 338, or a combination thereof to display the navigation map 240.

The display update module 508 can display portions of the directional-tile 214 based on the movement of the first device 102, the second device 106, or a combination thereof. The first device 102 can provide control signals for displaying the directional-tile 214 or portions therein or provide positional information for the first device 102, the second device 106, or a combination thereof to the second device 106.

It has been discovered that the frame 208 determined by the first device 102 and the directional-tile 214 generated by the first device 102 for displaying on the second device 106 provides stability and accuracy for the navigation system 100. The frame 208 determined by the first device 102 and the directional-tile 214 generated by the first device 102 can provide the stability and accuracy by providing navigational updates for the second device 106 for tracking the user without relying on the host device 108 and continue navigation when connection to the host device 108 is lost or unstable.

It has further been discovered that the navigation map 240 displayed on the second device 106 using the directional-tile 214 generated by the first device 102 provides faster and accurate guidance for the user. The navigation map 240 displayed on the second device 106 using the directional-tile 214 generated by the first device 102 provides faster and accurate guidance by using immediate readings of the acceleration 220 and the rotational movement 222 from the first device 102 to track the user and update the display of the map 206 instead of relying only on GPS signals.

It has also been discovered that the navigation map 240 displayed using the directional-tile 214, the relative-forward direction 238, and the reverse-movement 524 using the acceleration 220 and the rotational movement 222 of the first device 102 provide consistency and increased usability. The navigation map 240 displayed using the directional-tile 214, the relative-forward direction 238, and the reverse-movement 524 using actual movement of the first device 102 provide consistency and increased usability by displaying the map 206 such that the user's movements are consistently displayed in a known orientation, which provides a constant orientation for displaying the map 206. The use of actual movement readings and the reverse-movement 524 can increase the accuracy and provide faster updates for the navigation system 100.

The navigation system 100 can divide the processes between the functional units of the first device 102. For example, the direction-normalization module 502, the movement calculation module 504, or a combination thereof can use the first control unit 312 to process the movement related data. The map calculation module 506 can use the first user interface 318, which can have a GPU implemented with hardware acceleration, to process the map 206 and generate the directional-tile 214.

It has been discovered that generating the directional-tile 214 using the first user interface 318 for displaying on the second device 106 provides decreased processing burden for the navigation system 100. The directional-tile 214 generated using the first user interface 318 provides decreased processing burden by allowing the first control unit 312 to process other information while decreasing processing burden of the second device 106, the host device 108, or a combination thereof.

For example, the host device 108 can be supporting many instances of users, increasing processing burden and making it difficult or impossible to provide portions of the map 206 suitable for each of the users. The processes for generating and rotating the directional-tile 214 specifically for each user can be performed by the first device 102. Thusly, the navigation system 100 can provide a unique way to serve map requirements for each user by supporting it uniquely from the first device 102.

Also for example, the second device 106 can be a light weight head unit integrated with the vehicle. The second device 106 can access an application programming interface (API) or a uniform resource locator (URL) to receive services and images of the map 206 or portions thereof from the first device 102. The second device 106 can be without or not utilize an operating system, positioning or route calculating functionality, or a combination thereof.

As a specific example of embodiment for the navigation system 100, the second device 106 can have no capability to rotate the map 206 and the first device 102 cannot create directional-tile 214 corresponding to each heading direction. The resource cost and the processing burden can be reduced by having different orientations of the directional-tile 214 stored in the rotation set 210 and selecting the appropriate orientation as described above.

The navigation system 100 has been described with module functions or order as an example. The navigation system 100 can partition the modules differently or order the modules differently. For example, functions of the direction-normalization module 502 and the movement calculation module 504 or functions of the framing module 532 and the tiling module 534 can be combined. Also for example, the tile generation or the functions of the adjustment module 536 can be done in the display update module 508.

The modules described in this application can be hardware implementation or hardware accelerators in the first control unit 316, the second control unit 338, the host control unit 438, the first user interface 318, the second user interface 338, the hose user interface 438, or a combination thereof. The modules can also be hardware implementation or hardware accelerators within the first device 102, the second device 106, or the host device 108 but outside of the first control unit 316, the second control unit 338, the host control unit 438, the first user interface 318, the second user interface 338, the hose user interface 438, or a combination thereof.

The physical transformation from the navigation map and the directional-tile 214, results in the movement in the physical world, such as user searching for or traveling to a destination using the display of the map 206. Movement in the physical world results in changes to the current location 224, the acceleration 220, the rotational movement 222, or a combination thereof, which can be further captured by the directional-tile 214 and the navigation map 240.

Figure 6:
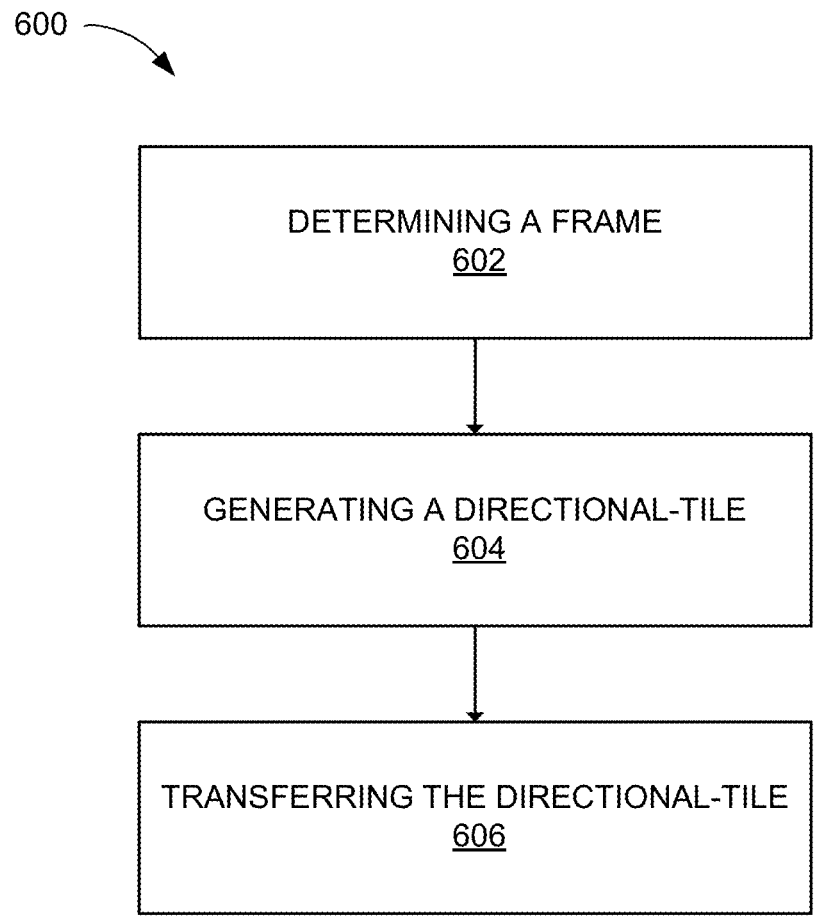
FIG. 6 is a flow chart of a method of operation of a navigation system in an embodiment of the present invention.

Referring now to FIG. 6, therein is shown a flow chart of a method 600 of operation of a navigation system 100 in an embodiment of the present invention. The method 600 includes: determining a frame of a map based on a current travel-direction for tracking a movement of a first device in a block 602; generating a directional-tile from the frame based on the current travel-direction in a block 604; and transferring the directional-tile for displaying a navigation map on a second device using the directional-tile from the first device in a block 606.

The resulting method, process, apparatus, device, product, and/or system is straightforward, cost-effective, uncomplicated, highly versadirectional-tile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a navigation system comprising:
    determining a frame of a map using a control unit of a first device based on a current travel-direction for tracking a movement of the first device;
    generating a directional-tile from the frame using a user interface based on the current travel-direction; and
    transferring the directional-tile using a communication unit for displaying a navigation map on a second device using the directional-tile from the first device without recalculating an entire display of a screen of the second device.

2. The method as claimed in claim 1 wherein:
    determining the frame includes determining an acceleration, a rotational movement, or a combination thereof for tracking a movement of the first device, the second device, or a combination thereof;
    transferring the directional-tile includes transferring the directional-tile for tracking the movement of the first device, the second device, or a combination thereof on the second device.

3. The method as claimed in claim 1 wherein generating the directional-tile includes selecting the directional-tile from a rotation set having two, four, eight or more selections for controlling display of a map.

4. The method as claimed in claim 1 wherein generating the directional-tile includes rotating a portion of the frame according to a rotation set.

5. The method as claimed in claim 1 further comprising adjusting the directional-tile based on a map-characteristic, a display-characteristic, or a combination thereof.

6. A method of operation of a navigation system comprising:
    calculating a current travel-direction for tracking a movement of a combination of a first device and a second device using the first device, a host device, or a combination thereof;
    determining a frame of a map using a control unit of the first device based on the current travel-direction for tracking the movement of the first device using the first device, the host device, or a combination thereof;
    generating a directional-tile from the frame using a user interface based on the current travel-direction for tracking the movement of first device using the first device;
    transferring the directional-tile using a communication unit for displaying a navigation map on the second device using the directional-tile from the first device without recalculating an entire display of a screen of the second device.

7. The method as claimed in claim 6 wherein:
    transferring the directional-tile includes transferring the directional-tile for displaying the project-map with the current travel-direction not pointed toward a screen bottom-portion; and
    generating the directional-tile includes generating the directional-tile based on the current travel-direction and a reverse-movement.

8. The method as claimed in claim 6 wherein calculating the current travel-direction includes determining a reverse-movement.

9. The method as claimed in claim 6 wherein calculating the current travel-direction includes determining an independent device-movement based on the acceleration, the rotational movement, or a combination thereof.

10. The method as claimed in claim 6 further comprising determining a relative-forward direction for characterizing an orientation of the first device relative to the current travel-direction.

11. A navigation system comprising:
    a control unit configured to:
        determine a frame of a map using a first device based on a current travel-direction for tracking a movement of the first device;
    a user interface, coupled to the control unit, configured to generate a directional-tile from the frame based on the current travel-direction; and
    a communication unit, coupled to the control unit, configured to transfer the directional-tile for displaying a navigation map on the second device using the directional-tile from the first device without recalculating an entire display of a screen of the second device.

12. The system as claimed in claim 11 wherein the control unit is configured to:
   determine an acceleration, a rotational movement, or a combination thereof for tracking a movement of the first device, the second device, or a combination thereof; and wherein:
   the communication unit is configured to transfer the directional-tile for tracking the movement of the first device, the second device, or a combination thereof on the second device.

13. The system as claimed in claim 11 wherein the control unit is configured to select the directional-tile from a rotation set having two, four, eight or more selections for controlling display of a map.

14. The system as claimed in claim 11 wherein the control unit is configured to rotate a portion of the frame according to a rotation set.

15. The system as claimed in claim 11 wherein the control unit is configured to adjust the directional-tile based on a map-characteristic, a display-characteristic, or a combination thereof.

16. The system as claimed in claim 11 wherein the control unit is configured to:
   calculate the current travel-direction for tracking a movement of a combination of the first device and the second device using the first device, a host device, or a combination thereof;
   determine the frame of the map based on the current travel-direction for tracking the movement of the first device using the first device, the host device, or a combination thereof; and
   generate the directional-tile from the frame based on the current travel-direction for tracking the movement of the first device using the first device.

17. The system as claimed in claim 16 wherein the communication unit is configured to transfer the directional-tile for displaying the project-map with the current travel-direction not pointed toward a screen bottom-portion.

18. The system as claimed in claim 16 wherein the control unit is configured to:
   determine a reverse-movement; and
   generate the directional-tile from the frame based on the current travel-direction and the reverse-movement.

19. The system as claimed in claim 16 wherein the control unit is configured to determine an independent device-movement based on the acceleration, the rotational movement, or a combination thereof.

20. The system as claimed in claim 16 wherein the control unit is configured to determine a relative-forward direction for characterizing an orientation of the first device relative to the current travel-direction.

* * * * *